United States Patent [19]

Markson et al.

[11] Patent Number: 5,057,820

[45] Date of Patent: Oct. 15, 1991

[54] OPTICAL WARNING SYSTEM

[75] Inventors: Ralph J. Markson, Weston; Johan A. Govaert, Peabody, both of Mass.

[73] Assignee: Airborne Research Associates, Inc., Weston, Mass.

[21] Appl. No.: 345,720

[22] Filed: May 1, 1989

[51] Int. Cl.[5] .................................... G08B 17/12
[52] U.S. Cl. ............................. 340/600; 340/601; 340/961; 340/981; 73/170 R; 250/214 RC
[58] Field of Search ............ 340/600, 601, 522, 961, 340/981, 982; 324/133, 72; 73/170 R; 250/214 B, 214 RC

[56] References Cited

U.S. PATENT DOCUMENTS

| | | | |
|---|---|---|---|
| 3,551,676 | 12/1970 | Runnels | 250/83.3 |
| 3,611,365 | 10/1971 | Lundquist et al. | 340/601 |
| 3,652,981 | 3/1972 | Campanella | 340/961 |
| 3,736,559 | 5/1973 | Trageser | 340/961 |
| 3,790,884 | 2/1974 | Kohl | 324/72 |
| 3,846,746 | 11/1974 | Trageser | 340/961 |
| 3,937,951 | 2/1976 | Krider | 250/209 |
| 3,940,607 | 2/1976 | Krider | 250/209 |
| 4,023,408 | 5/1977 | Ryan et al. | 73/170 R |
| 4,143,264 | 3/1979 | Gilbert et al. | 250/214 B |
| 4,276,576 | 6/1981 | Uman et al. | 361/1 |
| 4,527,158 | 7/1985 | Runnels | 340/961 |
| 4,684,951 | 8/1987 | Baumer | 342/362 |
| 4,724,312 | 2/1988 | Snaper | 250/221 |
| 4,897,538 | 1/1990 | Lemaire et al. | 350/214 B |

OTHER PUBLICATIONS

B. Vonnegut and R. E. Passarelli, "Modified Cine Sound Camera for Photographing Thunderstorms and Recording Lightning" *Jour. of App. Meterology*, vol. 17, p. 1097, (Nov. 1978).

L. W. Parker and H. W. Kasemir "Airborne Warning Systems for Natural and Aircraft Lightning", IEEE Trans. on *ELectromagnetic Computability*, vol. EMC-24, No. 2, pp. 150-171.

M. Brook et al., "Electric-Field Changes and the Design of Lightning-Flash Counters", Journal of Geophysical Research, vol. 65, No. 7 pp. 1927-1931 (Jul. 1960).

*Primary Examiner*—Reinhard J. Eisenzopf
*Assistant Examiner*—Geoff Sutcliffe
*Attorney, Agent, or Firm*—Weingarten, Schurgin, Gagnebin & Hayes

[57] ABSTRACT

A lightning and strobe light detector and warning system capable of distinguishing strobe light and lightning flashes and indicating to an operator of the existence of a flash even under high illumination background conditions. The device may comprise a plurality of detectors and therefore not only distinguish between the strobe and lighting flashes but also indicate the direction of a flash.

13 Claims, 5 Drawing Sheets

OPTICAL WARNING SYSTEM

FIELD OF THE INVENTION

The invention relates to a detection device for lighting and strobe lights.

BACKGROUND OF THE INVENTION

When an RF pulse is heard as a click on a radio or picked up by a lightning flash detector one does not know the location of the source or even if the signal came from lightning rather than a man-made RF source. On the other hand, when one sees lightning under or in a cloud there is no question regarding occurrence or location. The problem with visual lightning detection is that while the human eye is an excellent detector at night it is very poor in daylight. During the day, cloud to ground (CG) lightning can be seen against a dark background, but it is difficult to see against a bright background. Moreover, intracloud (IC) flashes, which are the best indicators of thunderstorm development and occur 5 to 50 times as frequently as CG flashes, are almost never seen in daylight.

Because CG lightning flashes are easily observed and therefore commonly thought of as representing "lightning", it is generally not realized that the rate of IC lightning is much higher than CG lightning. Not only does IC lightning provide a better statistical basis for detection and quantifying thunderstorm activity, it usually commences in the upper portion of clouds during the updraft phase of convective cell development—well before electrification of the lower part of the cloud by the subsequent downdraft which produces CG discharges. Experience indicates that optical signals from IC lightning were usually detected 10 to 15 minutes before any CG lightning is reported. Also, CG flashes are relatively "few and far between", and not well correlated with the most active cloud volumes, whereas IC lightning is frequent and closely related to convective regions. This is significant because other aspects of thunderstorms besides lightning, such as hail and microburst winds, are hazardous to certain ground operations. Thus the ability to detect IC lightning is not only advantageous for monitoring thunderstorm development and intensity, but it can provide earlier warning than systems which only detect CG lightning.

Strobe lights, such as found on aircraft, also generate pulses of light which are optically detectable. In the past, several detectors have been developed to indicate the presence of strobe lights to provide a warning indication to pilots that another aircraft was in the vicinity. Although a pilot is generally interested in both the presence and direction of both other aircraft and thunderstorms, no device capable of discriminating between flashes produced by aircraft strobes and flashes produced by thunderstorms has been developed.

SUMMARY OF THE INVENTION

In one embodiment, the invention comprises an optical detector which is responsive to light from a lightning flash or a strobe light; an amplifier, a band pass filter to substantially remove substantially all detected signals other than light from lightning or a strobe, a threshold circuit to adjust the output for variations in background lighting, and a display device or audible sound to indicate the presence of lightning or a strobe.

In another embodiment, two optical detectors are coupled through a coincidence circuit so that both detectors must detect a pulse before lightning or a strobe light flash is indicated.

In still another embodiment, the optical detector is coupled with an RF detector through a coincidence circuit such that both the optical and the RF detector must register a pulse simultaneously for lightning to be indicated.

In yet another embodiment, the optical detector is coupled through a pulse discriminator such that two or more pulses must be detected within a specified time for lightning to be distinguished from strobe lights.

In still yet another embodiment, the device comprises a plurality of detectors which indicate not only the presence but the bearing of the flash.

In further yet another embodiment, the device produces a warning of a collision when the relative bearing of a signal from a strobe light us unchanging and the intensity of the strobe signal is increasing.

DESCRIPTION OF THE PREFERRED EMBODIMENTS

An embodiment of the invention is an optical sensing system that will detect photoelectric emission from lightning during daylight with almost as much sensitivity as the eye at night. It detects IC lightning within the brightest sunlit clouds. The sensor responds to rapid changes in light intensity. False alarms which can occur for a variety of reasons have been eliminated. It has been possible to exclude reflective glints from atmospheric particles, surfaces and distinguish strobe lights—the only light sources detected other than lightning—so when a signal is received there is little question whether a pulse of light from lightning or a strobe light occurred in the field of view. A band pass filter tailored to the optical signature of lightning or strobe lights discriminates against most other light variations which are slower and longer in duration. Electrostatic shielding prevents RF triggering of the optical section.

The circuitry includes automatic setting of the detection threshold to a level just above that of the noise level generated by background light in the field of view which varies as the detector is pointed in different directions or as clouds change position. This maximizes detection sensitivity.

The detector's range is essentially "line of sight", but it is also capable of picking up lightning from clouds behind those in the foreground because of light transmission through the thin veil of high cirrus clouds that is generally present in the region of thunderstorms. Thus, the range is not restricted to the closest clouds and can be on the order of 50 km even when other clouds are between the lightning and detector. The range can be more than 100 km if thunderclouds at that distance are in the field of view.

Figure 1:
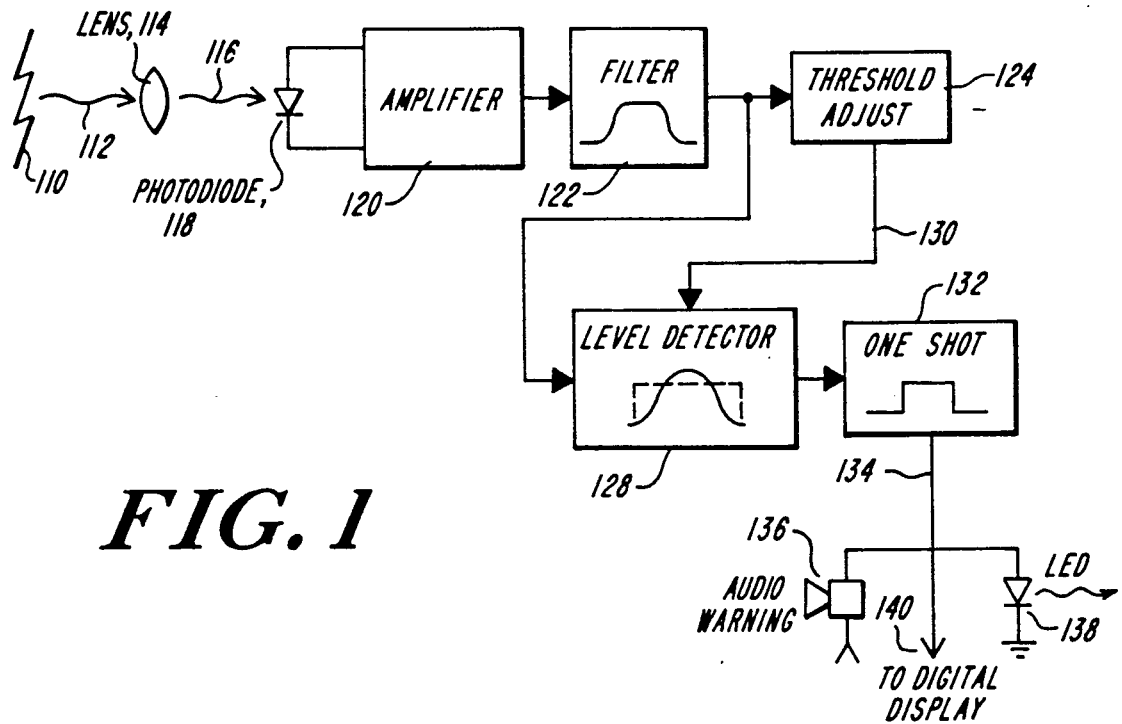
FIG. 1 is a block diagram of a generalized embodiment of the invention.

Referring to FIG. 1, a lightning discharge 110 produces visible light 112 which is focused 116 by lens 114 onto a photodiode 118. The single lens provides a field of view of 20°. Removing the lens, the field of view is 140°. Narrow, wide angle, fish eye, or other types of lenses can also be used. Lightning or strobe flashes can be detected with the lens looking through glass and plastic windows from inside buildings, cars and aircraft. The output signal of the photodiode 118 is the input to amplifier 120, whose output signal is filtered by band pass filter 122. Band pass filter 122 is constructed to substantially permit signals having frequencies in the range of about 2–15 KHz to pass through to level detector 128.

The output of the band pass filter 122 is also an input to a threshold adjust circuit 124, the output of which is used by the level detector 128 to determine if the signal exceeds a predetermined threshold level. If the threshold is exceeded, the signal from the threshold detector 128 triggers a retriggerable monostable multivibrator (one shot) 132 and the output pulse 134 from the one shot 132 is used to trigger a warning device. The warning device may take the form of an audible alarm 136 and/or a light emitting diode 138 or act as a pulse 140 to a digital display.

In one embodiment, the optical lightning detector can be hand held and pointed at different clouds or parts of the sky to be surveyed, or it can be placed on the ground or a support pointing toward the sector to be monitored. Each lightning flash produces a loud audible beep which can be heard away from the detector allowing personnel in the area to work without having to divert attention to the detector. An electrical signal output 140 is available so that a loud alarm can be sounded or a signal sent to a remote station if a certain flash rate is exceeded (e.g., one per minute).

Figure 5:
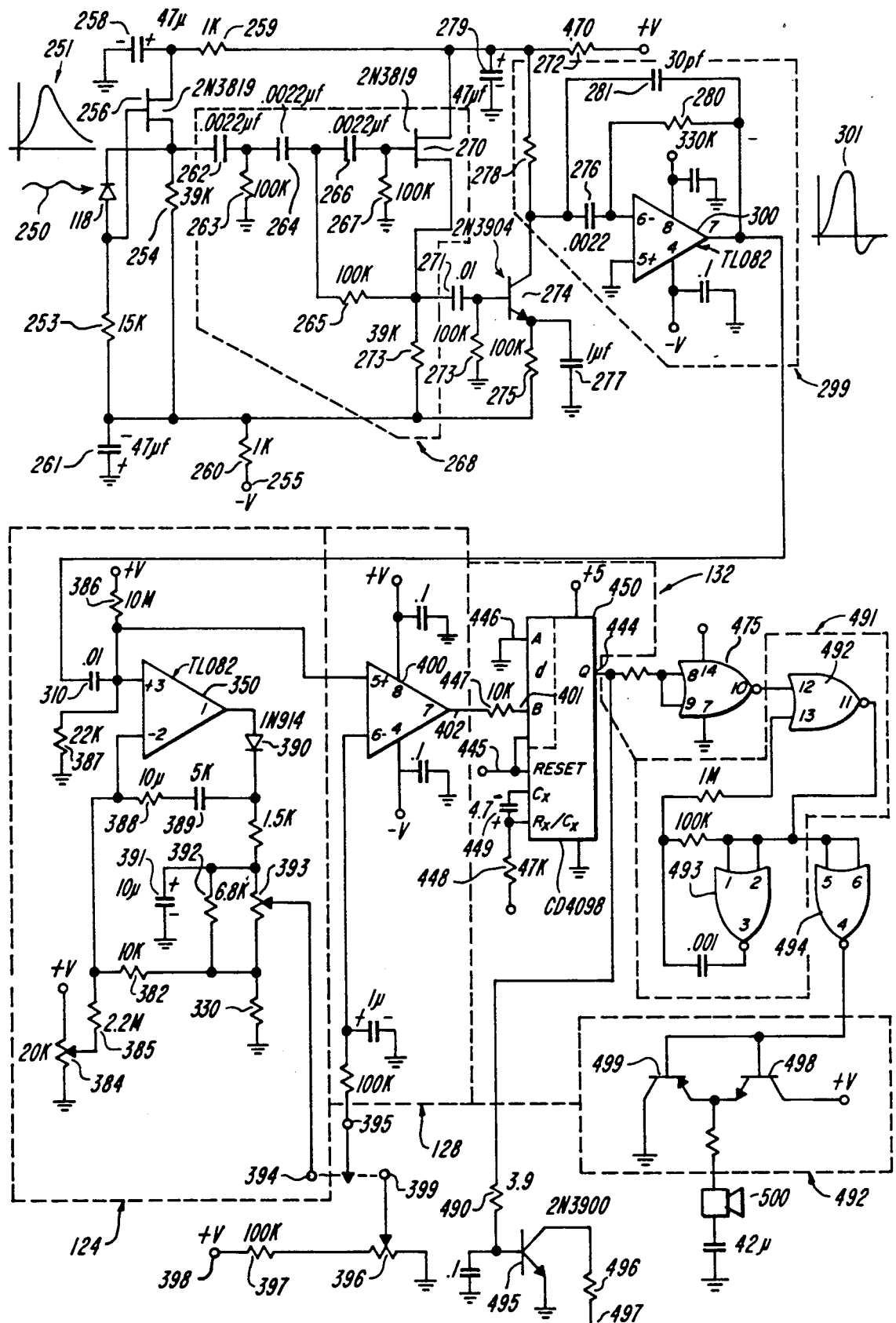
FIG. 5 is a schematic of an embodiment of the warning device shown in the block diagram of FIG. 1.

Referring to FIG. 5, visible light 250 having an approximate pulse shape 251 from a lightning or strobe flash, impinges upon detector 118 permitting current flow and generating a voltage drop (signal) across resistor 253. The signal generated is applied to the gate of FET 256 configured as a voltage follower amplifier. The FET 256 is biased (FIG. 1 120) by a negative voltage 255 applied through a resistor 254. Two RC networks of resistor 260, capacitor 26 and resistor 259, capacitor 258 respectively decouple the power supply for FET 256 in order to prevent noise from the power supply from affecting the signal.

The signal generated by photodiode 118 and amplified by the voltage follower is the input to a high pass filter 268 comprising a series of capacitors 262, 264, and 266, resistors 263, 265, and 267, FET 270 and resistor 273 which filters the signal prior to its being applied through a d.c. blocking capacitor 271 to a transistor 274 biased by voltage (V+) through resistor 273. Again the resistor capacitor pairs 272, 279 and 275, 277 decouple the power supply.

The amplified signal from the transistor 274 is the input signal to a band pass filter 299 comprising resistor 278, capacitors 276 and 281, resistor 280 and op amp 300. The output of this filter is a waveform 301 which is positive going when a pulse of light is detected. High pass filter 268 and band pass filter 299 comprise the filter 122 of FIG. 1. The filtered output signal is the input signal through a coupling capacitor 310 to a background light compensation stage 124 comprising an op-amp 350 to whose positive input the signal is applied, and whose output is rectified by diode 390 and stabilized by capacitor 389 and resistor 388 in the feedback loop to its negative input.

The rectified output produces a d.c. voltage level across the RC combination 392, 391 and variable resistor 393. A portion of the d.c. voltage value across variable resistor 393 is taken as a reference voltage for the next stage, about which more will be said. The value of the voltage on the negative input of the op-amp 350 is not only determined by the feedback voltage but also due to the portion of the voltage (+V) across resistor 384 which is applied through resistor 385 to the negative input. This voltage is the zero adjustment for the threshold adjust circuit 124, which is the threshold adjust box 124 in FIG. 1.

When switch 395 is connected across terminal 394, the portion of the d.c. voltage from resistor 393 is the input to the negative terminal of the level detector circuit 128. When switch 395 is connected across terminal 399 a portion of the voltage drop from (+V) 398 to ground across resistors 396 and 397 is applied as the reference to the negative terminal of the op amp 400 of the level detector circuit 128.

The signal from op amp 300 which is applied to the positive terminal of op amp 350 is also applied to the positive terminal of op amp 400, which is part of the level detector circuit 128. An output signal 402 will appear on the output of op amp 400 whenever the value on the positive terminal exceeds the value on the negative terminal of the op-amp. Therefore, when switch 395 is across terminal 394, an output signal 402 will be present when the filtered signal from the detector on positive input terminal exceeds the d.c. level generated by the threshold adjust circuit 124. That is, when there is a flash of light above threshold (background) levels of light intensity. When the switch 315 is across terminal 399, an arbitrary background value can be set by the operator by adjusting the voltage drop selected from resistor 396.

The output signal from the level detector 128 is the input applied signal to the one shot 132, through resistor 447, to the B input terminal 128 of retriggerable monostable multivibrator 450. The A input terminal 446 of the multivibrator 450 is set to ground, and the reset or clear line 445 is set high. The width of the output pulse from terminal 444, is determined by the resistor 448 and capacitor 449 combination supplying voltage (V+) to the $C_x$ and $R_xC_x$ terminals of the multivibrator 450.

The output of the multivibrator 450 is used to provide display signals either directly or through additional circuitry not shown. Two examples of directly driven displays are light emitting diodes or audible alarms. In the case of an LED, the output signal 444 is applied to a transistor 495 through a resistor 490. When a pulse appears on the output line 444, transistor 495 switches on, allowing current flow from voltage 489 through resistor 496 and LED 497 to ground, causing LED 497 to emit light. This arrangement can be used to switch a number of devices.

Additionally the output 444 of the monostable multivibrator is the input to an inverter 475, whose output is one input to an oscillator circuit 491. The oscillator 491 comprising two gates, 492 and 493 and generates an output waveform which is the input to gate 494 which acts as a driver. The driver gate 494, is used to drive transistors 498 and 499 which form a power amplifier 492 used to drive speaker 500.

Figure 2:
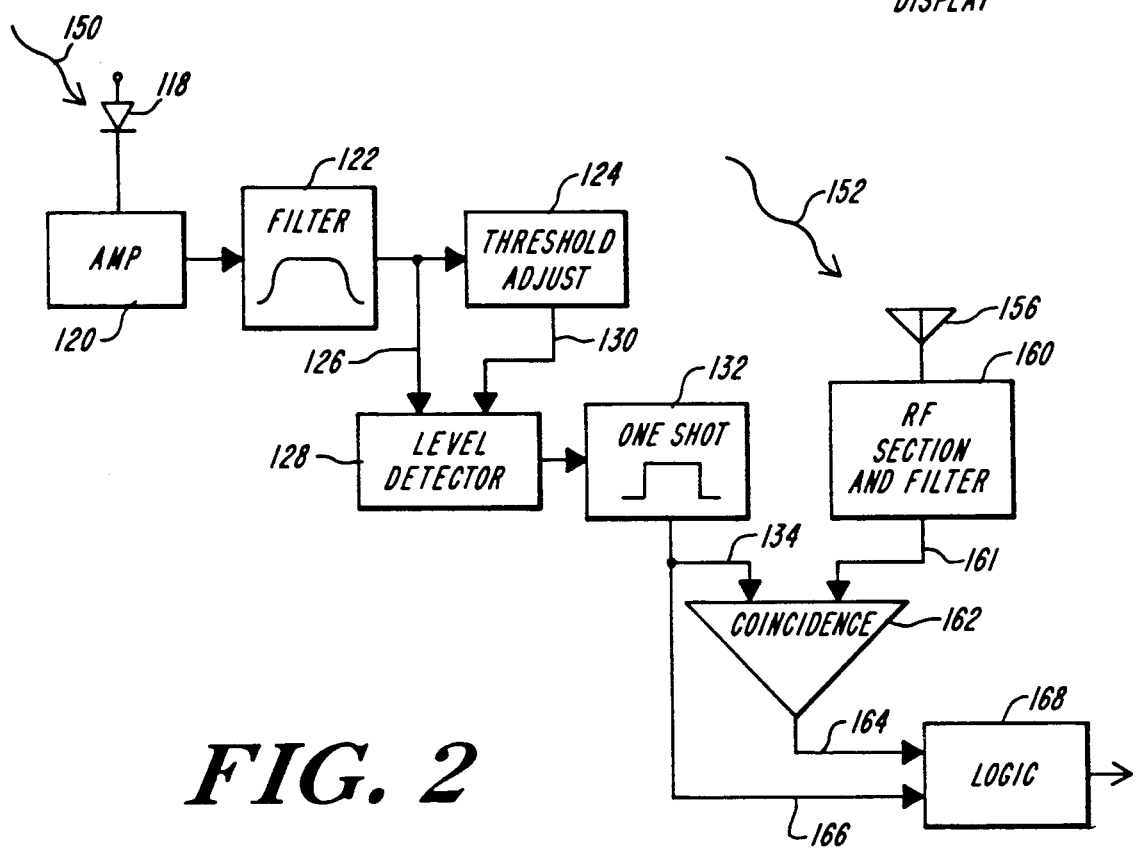
FIG. 2 is a block diagram of an embodiment of the detector portion of the invention comprising an RF-visible light coincidence circuit.

An embodiment for discriminating between pulses of light caused by lightning or caused by strobe lights is shown in FIG. 2. Since the sensing circuit responds to strobe lights as well as lighting,—and is so sensitive that an aircraft strobe light can be detected at distances greater than 5 km—such signals are discriminated in this embodiment by a radio-frequency (RF) coincidence circuit. The instrument utilizes an RF detector section so that both coincident optical and RF signals are required to identify and verify lightning occurrence. A lightning stroke generates electromagnetic radiation in the visible 150 and the RF 152 portions of the spectrum. As in the previous embodiment, a visible light detector 118 produces a signal which is amplified 120, filtered 122, and threshold set 124, 128 prior to triggering a one shot 132. RF radiation 152. also produced by the lightning, is received by an antenna 156, amplified and filtered by an RF detector section 160 prior to generating a pulse 161. If the RF detection section 160 and the one shot 132 both produce pulses at substantially the same time, coincidence circuit 162 produces an output signal 164 indicative of the presence of lightning. The one shot 132 also produces a signal 166 which is not an input to the coincidence circuit 162. A logic circuit 168 determines if a coincidence pulse 164 is present at the same time as the visible light pulse 166.

Since strobe lights do not produce sufficient RF to be detected at any significant distance, the presence of a signal from the visible light detection section and not from the coincidence circuit 162 indicates that the light was from a strobe light and not a lightning flash. The output of the logic circuit 168 is then the input to a display which indicates if a lightning or a strobe-light flash was detected.

Figure 3:
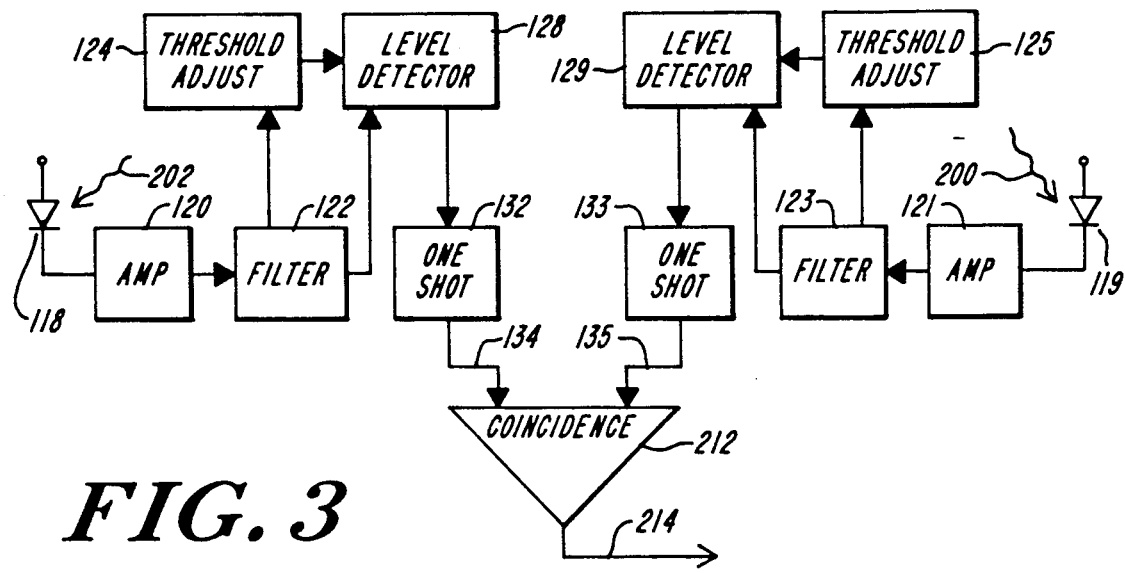
FIG. 3 is a block diagram of an embodiment of the visible light detection portion of the invention, comprising two detectors and a coincidence circuit.

Detectors are capable of generating a signal pulse even when there has been no actual flash detected. This is the result of circuit and detector noise. These random pulses are infrequent, but are a source of false flash indications which are undesireable. One way to avoid these false flash indications is to use two detectors as in FIG. 3. A flash of lightning produces many photons 200 and 202 which impinge upon two detectors 119 and 118, respectively. Again, the signals are amplified 120, 121, filtered 122, 123, threshold detected 124, 128 and 125, 129 and used to trigger a one shot 132, 133 which produce output pulses 134 and 135 which are input signals to a coincidence circuit 212. The coincidence circuit 212 produces an output 214 only when two pulses are received together. Since detector noise as described above is random, it is extremely unlikely that both detectors 118 and 119 will generate a spurious pulse at the same time and thereby trigger coincidence circuit 212. In this way, the false warnings in the system are reduced.

Figure 4:
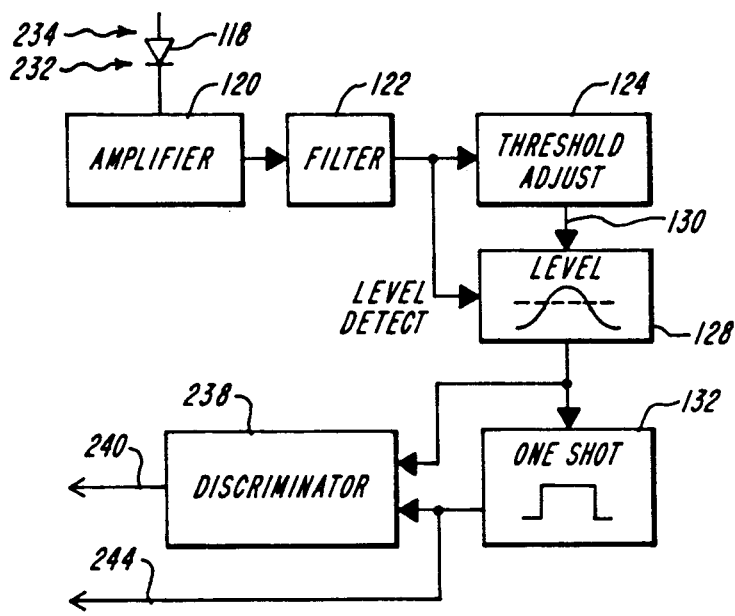
FIG. 4 is a block diagram of a multiple stroke detector embodiment of the invention comprising a detector portion and a multiple pulse discriminator.

Another embodiment to distinguish strobe flashes from lightning is shown in FIG. 4. A lightning flash usually is a series of closely spaced light pulses from several strokes. Therefore, to determine that the flash is in fact lightning, a detector 118 detects two closely spaced light pulses 232 and 234. These flashes are amplified 120, filtered 122 and threshold adjusted 124, 128 as described before. If the pulses are determined by discriminator 238 to have occurred within a specific interval of each other, the discriminator 238 indicates that lightning has occurred 240. If one pulse 232 is not followed closely by a second pulse, the discriminator 238 produces no signal and the presence of one optical signal 244 from the one shot 132 indicates that the flash was probably from a strobe light It should be noted that although lightning is frequently multiple flashes, it need not be, so false indications of strobe lights with a failure to designate lightning is possible with this embodiment.

Figure 6:
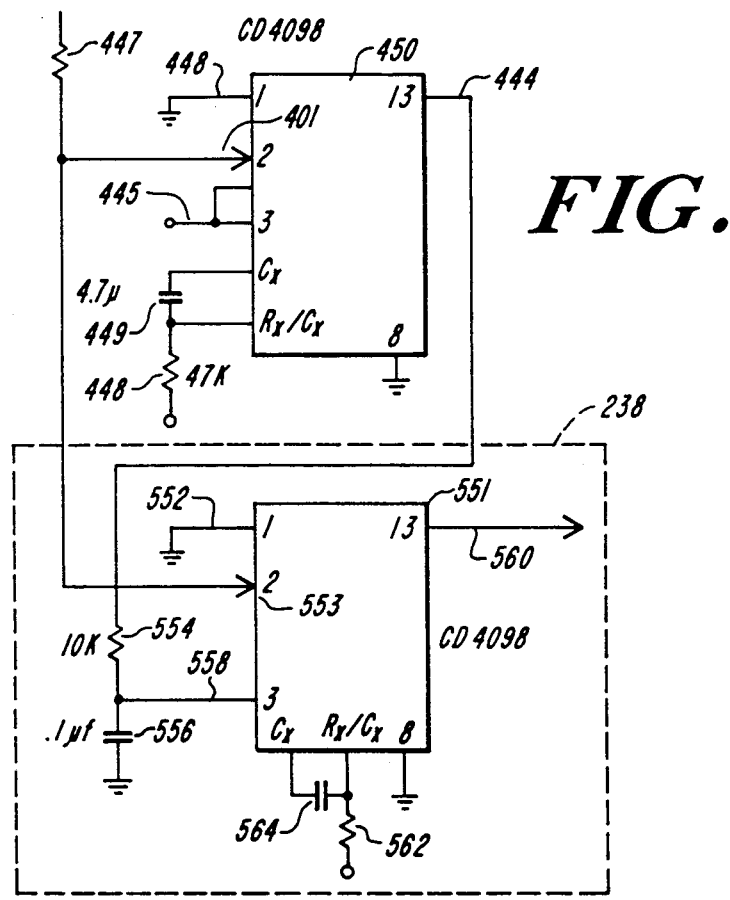
FIG. 6 is a schematic of an embodiment of the pulse discriminator of FIG. 4.

An example of a circuit which will perform this pulse discrimination is shown in FIG. 6. In this example, the discriminator 238 comprises a second retriggerable monostable multivibrator 551 in cooperation with the on shot 132 previously described. In this embodiment, the signal through resistor 447 (FIG. 5) is also the input signal to terminal B 553 of multivibrator 551. As with multivibrator 450, the A input 552 of multivibrator 551 is held at ground. The output signal from the multivibrator 444 is an input signal to the clear line 558 of multivibrator 551, through a resistor 554, which is attached to ground through a capacitor 556.

When a pulse is detected, the B input lines 401, 553 of both multivibrators 450 and 451 go high but since the clear line 558 of the second multivibrator is low, no output occurs on its output line 560. The output of multivibrator 444 then causes the clear line 558 to go high after some time determined by the RC combination 554 and 556. However, the B input line 557 of multivibrator 551 is no longer high by the time the clear line has gone high, and again no output pulse occurs on line 560. If however a second pulse signal occurs causing the B input 553 of multivibrator 551 to transition high during the the clear line 558 is held high, a pulse will be generated on output line 560. The width of this pulse is again determined by resistor 562 and capacitor 564 connected across the $C_x$ and $R_x/C_x$ terminals of multivibrator 551.

In this way, only if multiple pulses are detected during the a time period determined by resistor 554 and capacitor 556, will an output signal be generated. For the values shown for the resistor and capacitor in the embodiment, 10K and 0.1 $\mu f$ respectively, two flashes occurring no sooner than 15 msec will generate an output signal. The maximum time between pulses is determined by the RC circuit comprising resistor 448 and capacitor 449. With a resistor of 47K ohms and a capacitor of 4.7 $\mu f$ the maximum time between flashes is 75 msec in this embodiment.

Figure 7:
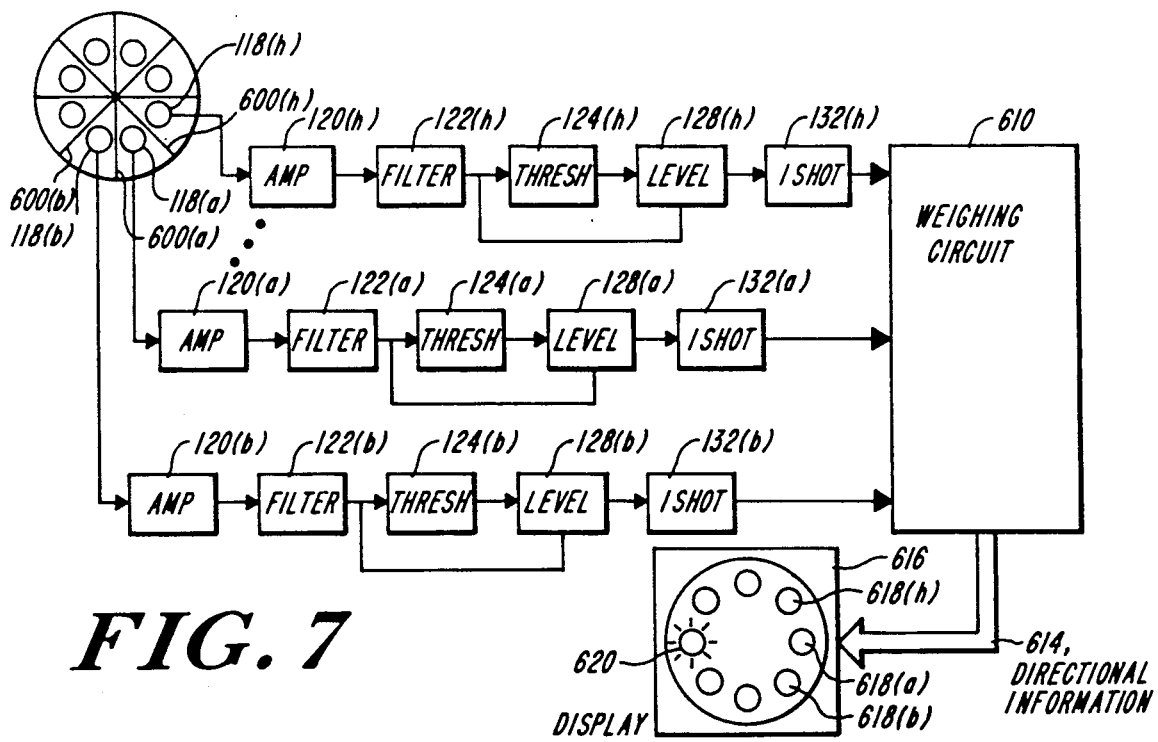
FIG. 7 is a block diagram of an embodiment of the invention having multiple detectors.

Referring now to FIG. 7, an embodiment of the invention which can be used to not only detect lightning or strobe lights but also indicate their direction comprises a series of detectors 118(a)-118(h) (only 118(a)-118(b) and 118(h) shown for clarity) located in a circle. Each detector is separated from one another by baffles 600(a)-600(h), (only 600(a), and 600(b) and 600(h) labeled for clarity) or optical arrangements so that each detector 118 sees only a 45° sector of sky. As before, the output of each detector is amplified by amplifiers 120(a)-120(h) (only amplifiers 120(a), 120(b) and 120(h) shown for clarity) and the output signals of each amplifier is filtered by band pass filters 122(a)-122(h) (only 122(a), 122(b) and 122(h) being shown for clarity). The output signals of the filters are the input signals to the thresholding circuits 124(a)-124(h) (only threshold circuits 124(a), 124(b) and 124(h) being shown for clarity) and level detectors 128(k)-128(h) (only level detectors 128(a), 128(b) and 128(h) being shown for clarity) as before, in order to remove background variations. The output signals from the threshold circuits are input signals to the level detectors. The output signal of each of the level detectors 128(a)-128(h) is an input signal to a one shot of each 132(a)-132(h) (only 132(a), 132(b) being shown for clarity). The output signals of the one shot 132(a)-132(h) are the input signals to a weighing circuit 610 which determines the direction of the flash by weighing the various filtered and thresholded signals from each detector 118. This is necessary since, for example, a lightning flash may occur across multiple sky sectors. The output signal 614 of the weighing circuit 610 provides the directional information to the display 616.

The display 616 can consist of a plurality of lights 618(a)-618(h) (only 618(a), 618(b), and 618(h) being labeled for clarity). The light corresponding to the sector in which the flash has occured can be illuminated or be set blinking 620 to indicate the direction of the flash.

It is also possible to devise a circuit in which the output from the band pass filters 122(a)-122(h) are weighted prior to thresholding and level detecting. In this embodiment, the thresholding and level detecting provides a threshold value as determined by all the detectors.

It is also possible to enhance the multidetector embodiments to provide an indication not only of the direction of a strobe light, but to also warn of an impending collision with another aircraft. A collision course is indicated when the relative bearing of the strobe flashes does not change with time and the intensity of the flashes increases. It should be noted that if the aircraft with the detector is turning, the bearing may change but the aircraft may still be on a collision course. This warning system will not warn in this instance. Therefore, it is possible to incorporate circuitry in the display which will produce an alarm such as a blinking light or audible alarm when the bearing is constant for a set period of time and the intensity of the light as seen by the detectors increases. Such a device would by necessity, be adjustable to allow the pilot adjust the period of time over which the constant bearing measurement and increasing intensity is to be made. This is necessary because a 20 second warning measurement period which may be appropriate for an unpopulated airspace may be inappropriate for the airspace near an airport.

Figure 8:
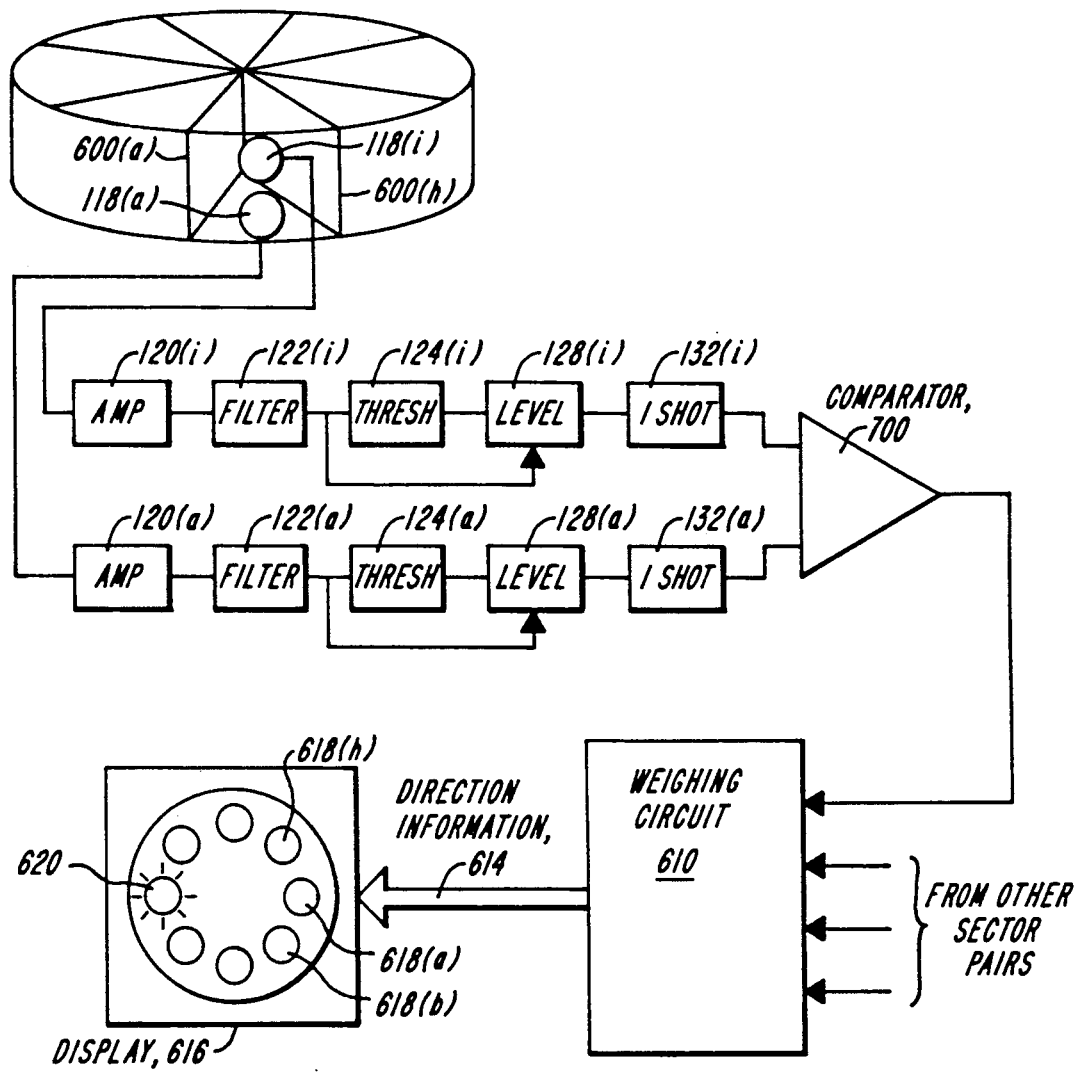
FIG. 8 is a block diagram of an embodiment of the invention as shown in FIG. 7 utilizing the coincidence circuit as shown in FIG. 3.

The multiple sensor embodiment can of course utilize either of the techniques shown in FIG. 2 or FIG. 4 to discriminate strobe and lightning flashes. Further, the coincidence circuitry of FIG. 3 can be incorporated to reduce the spurious signals. Referring to FIG. 8, a coincidence circuit can be used to reduce the spurious alarms by providing a double set of sensors 118(a)-118(p) comprising two sensors for each sector. One way that this could be accomplished is to provide two detectors, one above the other (for example 118(a) and 118(i), only two detectors being shown for clarity) within a sector, the detectors within a sector being separated from the adjacent detectors of adjacent sectors by baffles, as shown previously. The output signal of each detector 118(a)-118(p) is an input signal to an amplifier 120(a)-120(p) (only 120(a) and 120(i) being shown for clarity). The, output signal from an amplifier is the input signal to a band pass filter 122(a)-122(p) (only 122(a) and 122(i) being shown for clarity) whose output signal is the input signal to a threshold circuit 124(a)-124(p) (only 124(a) and 124(i) being shown for clarity) and to a level detector 128(a)-128(p) (only 128(a) and 128(i) being shown for clarity). The output signal of the threshold circuit 124(a)-124(p) is also an input signal to level detector 128(a)-128(p). The output signals of the level detector 128(a)-12B(p), are the input signals to a coincidence circuit 700(a)-700(h). Only when the two detectors (e.g. 118(a), 118(i)) within a segment detect a signal will the level detectors (e.g. 128(a), 128(i)) produce a coincident signal and will the coincidence circuit 700(a) produce an output signal. The output signals of the coincidence circuits 700(a)-700(h) are the input signals to a weighing circuit 610 which weights the inputs signals to produce an output signal 614 of directional information to be displayed by detector 616.

It is possible to perform coincidence measurements with the weighing occuring prior to the thresholding and level detection. It is also possible to utilize a single set of detectors 118(a)-118(h) to determine coincidence by requiring that at least two adjacent sectors detect a flash for one to be reported.

It should also be apparent that other optical improvements are possible, such as using optical band pass filters allowing for example the emissions from nitrogen to be viewed by the detectors to help distinguish lightning from strobe lights.

Having shown the preferred embodiments, those skilled in the art will realize many variations are possible which will still be within the scope and spirit of the claimed invention. Therefore, it is the intention to limit the invention only as indicated by the scope of the claims.

What is claimed is:

1. A lightning and strobe light detection system comprising:
   an optical detector for producing a first electrical output signal in response to a lightning flash and light from a strobe lamp, and
   a signal discrimination circuit operative to determine whether said electrical output signal has been produced in response to lightning and whether said electrical output signal has been produced in response to light from a strobe lamp and operative to provide a first indication of lightning if said electrical output signal has been produced in response to lightning and operative to provide a second indication of light from a strobe lamp if said electrical output signal has been produced in response to light from a strobe lamp.

2. The system of claim 1 further comprising:
   a second optical detector for producing a second electrical output signal in response to a lightning flash and a strobe lamp flash, and
   a coincidence circuit responsive to said first electrical output signal and said second electrical output signal and which generates a coincidence output signal only when said first and second electrical output signals are received at essentially the same time, said discrimination circuit being responsive to said coincidence output signal.

3. The system of claim 1 further comprising:
   an RF detector for producing a third electrical output signal in response to lightning flash, and a coincidence circuit for receiving said first electrical output signal and said third electrical output signal and generating a first coincidence output signal only when said first electrical output signal and said third electrical output signal are received at essentially the same time, said discriminator ion circuit being responsive to said first coincidence output signal.

4. The system of claim 3 further comprising:
a second optical detector for producing a second electrical output signal in response to a lightning flash and a strobe lamp flash, and
a second coincidence circuit responsive to said first electrical output signal and said second electrical output signal and which generates a second coincidence output signal only when said first and second electrical output signals are received at essentially the same time,
said first coincidence circuit being responsive to said third electrical output signal and said second coincidence output signal, said first coincidence circuit producing a first coincidence output signal only when said second coincidence signal and said third electrical output signal are received at essentially the same time,
said discrimination circuit being responsive to said first coincidence output signal.

5. The system of claim 1 further including a rate indicator responsive to said indication by said discrimination circuit to indicate whether a predetermined flash rate is exceeded.

6. The system of claim 1 further comprising:
a second optical detector,
a second band pass filter connected so as to receive the output signal from said second detector,
a second threshold adjustment device which receives the output signal from said second filter,
a second level detector which receives the output signal from said second filter and the output from said second threshold adjustment device; and wherein said signal discrimination circuit further comprises:
a coincidence circuit responsive to the output of said first threshold adjustment device and the output of said second threshold adjustment device, which produces an output signal only when an input signal is received by the coincidence circuit from each of said threshold adjustment devices at essentially the same time, said signal discrimination circuit being responsive to the output of said coincidence circuit.

7. The system of claim 1 wherein said threshold adjustment device automatically sets its detection threshold to a level just above that of the noise level generated by background light in the field of view of said detector.

8. The system of claim 2 wherein said discriminator comprises circuitry for determining if a flash of light includes more than one pulse of light.

9. A lightning and strobe light detecting system comprising:
an optical detector capable of responding to the optical emissions of strobe lamp and lightning flashes, said detector producing an output signal proportional to the level of light detected;
a band pass filter connected so as to receive the output signal from said detector and allowing only those signals which fall within the band pass of the filter to pass through;
a threshold adjustment device which receives the signal from the band pass filter and determines the response of the detector to a background level of illumination, said adjustment device generating an output signal which is indicative of the background illumination level;
a level detector which receives the signal from the filter and the signal from the threshold adjustment device and produces an output signal only if the signal from the filter exceeds the background level from the threshold device;
a discriminator for determining whether said detected light is from lightning or a strobe lamp, said discriminator receiving said signal from said level detector and producing one output signal if lightning is detected and a second output signal if a strobe light from lamp is detected; and
a display which indicates the occurrence of a flash of light and whether the flash was caused by lightning or a strobe lamp, as indicated by the output signal of the level detector,
wherein said discriminator comprises circuitry for determining if a flash of light includes more than one pulse of light,
wherein said discriminator comprises a timing circuit which determines elapsed time between the pulses of light,
wherein said discriminator circuitry includes a first monostable multivibrator and a second monostable multivibrator, said first monostable multivibrator enabling said second monostable multivibrator if two of said pulses of light occur within a predetermined period of time,
wherein said pulses must occur between approximately 15 msec. and 75 msec. of each other.

10. A lightning and strobe light detection system comprising:
A. a plurality of optical units, each optical unit comprising
  i. a detector, capable of responding to the light emissions of strobe lamps and lightning flashes, said detector producing an output signal proportional to the level of light detected,
  ii. a band pass filter, connected so as to receive the output signal from said detector, said filter having a band pass allowing only an output signals having a predetermined range of frequencies to pass through;
  iii. a threshold adjustment device which receives the output signal passing through said filter and determines the response of said detector to a background level of illumination, said adjustment devices generating an output signal which is indicative of the background illumination level within the field of view of said detectors;
  iv. a level detector which receives the signal from said filter and the signal from said threshold adjustment device and produces an output signal only if the signal from said filter exceeds the background level from said threshold device;
B. a signal discriminating circuit operative to determine, for each detector, whether said output signal has been produced in response to lightning and whether said output signal has been produced in response to light from a strobe lamp and operative to provide, for each detector, a first indication of lightning if said output signal has been produced in response to lightning and operative to provide a second indication of light from a strobe lamp if said output signal has been produced in response to light from a strobe lamp; and C. a display which indicates the occurrence and bearing of said light emissions and whether the light emission was caused by lightning or a strobe lamp, said optical units being positioned so that each detector detects light emissions from a different direction.

11. The system of claim 10 wherein said optical units comprise a second detector such that said discriminating circuit does not produce said indicator signal unless both detectors detect said light emission at essentially the same time.

12. The system of claim 10 wherein said discriminating circuit further includes a weighing circuit which provides directional information from said output signals of said level detectors of said optical units to said display.

13. A method for detecting lightning and light from strobe lamps comprising the steps of:

detecting flashes of light with an optical detector;

determining whether said flashes of light are due to lightning and whether said flashes of light are due to strobe lamps; and producing a first lightning indication when lightning is detected and a second strobe indication when light from strobe lamps are detected.

* * * * *